United States Patent
Scheurman, III

(10) Patent No.: US 7,897,062 B1
(45) Date of Patent: *Mar. 1, 2011

(54) HIGH-SOLIDS LIME SLURRY

(75) Inventor: Clarence Scheurman, III, Westlake, OH (US)

(73) Assignee: Applied Specialties, Inc., Avon Lake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/758,969

(22) Filed: Apr. 13, 2010

Related U.S. Application Data

(63) Continuation-in-part of application No. 11/938,610, filed on Nov. 12, 2007, now Pat. No. 7,718,085.

(51) Int. Cl.
*C02F 5/10* (2006.01)

(52) U.S. Cl. ......... 252/181; 252/180; 252/189; 252/192; 423/594.16; 508/154

(58) Field of Classification Search ............... 252/313.1, 252/314, 180–181, 189, 192; 423/594.16; 508/154
See application file for complete search history.

(56) References Cited

U.S. PATENT DOCUMENTS

| 4,464,353 A | * | 8/1984 | Hains | 423/640 |
| 5,616,283 A | * | 4/1997 | Huege et al. | 252/192 |

* cited by examiner

*Primary Examiner* — Ling-Siu Choi
*Assistant Examiner* — Bijan Ahvazi
(74) *Attorney, Agent, or Firm* — Pearne & Gordon LLP

(57) ABSTRACT

Novel hydrated-lime slurry compositions are disclosed, which include a heat-stable polymeric dispersant. The polymeric dispersant is capable to withstand temperatures in excess of 212° F. experienced by the slurry as a result of the hydrolysis of quicklime to produce hydrated lime, and accordingly can be added to the slurry composition prior to the addition of quicklime. Methods for making such slurry compositions are also disclosed.

10 Claims, No Drawings

HIGH-SOLIDS LIME SLURRY

CROSS-REFERENCED TO RELATED APPLICATION

The present application is a continuation-in-part of application Ser. No. 11/938,610 filed Nov. 12, 2007, now U.S. Pat. No. 7,718,085. The entire text of the priority application is incorporated herein by reference in its entirety.

BACKGROUND

Suspensions of lime particles, often called lime slurries, are used in a variety of diverse applications. For example, lime slurries are commonly used in a water-softening process called "lime softening," where lime causes 'hardness' ions to precipitate from and settle out of solution thus softening the water. In wastewater and process water applications it can be desirable to use lime slurries (instead of conventional caustic NaOH solutions) to adjust the pH of, or to neutralize, acidic solutions on a commercial, municipal or industrial scale. One example of this is in sewage and wastewater treatment, where caustic solutions of sodium hydroxide are commonly used to treat large amounts of water that have an acidic pH, or to increase the pH of the water to kill bacteria, microbes and other organisms. To neutralize acidic solutions of both raw and treated water, caustic solutions are often used.

High-concentration caustic solutions (e.g. 50% NaOH, balance water) are typically used for many of these applications due to the difficulty in handling lime and its traditional slurries, described in summary below. Caustic solutions are highly dangerous and must be carefully controlled to ensure that humans do not come into contact with the solutions, which can cause severe burns. In addition, the solid NaOH particles that often are used to make caustic solutions by dissolution in water also present serious health concerns, and their use, shipment and storage must be carefully controlled, and are subject to numerous safety regulations. Lime is considerably less expensive than NaOH and also preferable from a health-safety standpoint, but handling problems associated with lime typically overshadow its use.

Lime slurries are sometimes used as a substitute for caustic solutions to raise or neutralize the pH of commercial-scale acidic solutions such as treated wastewater. Unlike NaOH solution, these slurries are not true solutions but instead are suspensions of solid particles of hydrated lime in water. To make a lime slurry, particles of quicklime (CaO) are added to a water carrier, wherein the quicklime particles are hydrolyzed to produce particles of hydrated lime ($Ca(OH)_2$). The hydrolysis reaction is extremely exothermic, producing a large amount of heat and raising the temperature of the slurry. For example, to make a ~30 to ~40 weight percent $Ca(OH)_2$ suspension in ~24,000 gallons of water, sufficient heat can be generated to raise the temperature of the slurry to 225° F. or greater before the reaction is completed and the mixture begins to cool.

To approach the neutralization power of conventional caustic solutions, very-high solids lime slurries must be used, for example at or exceeding 30% hydrated lime solids by weight. But using such high-content lime solids is problematic because the resulting viscosity can render the slurries impractical or un-useful from a materials-handling standpoint. Gypsum can be used to reduce the viscosity of a high-solids content lime slurry, but conventionally the addition of gypsum has been known to cause large agglomerations of lime particles to form, which tend to come out of suspension more readily and may block pipes or other materials-handling equipment.

Another method to moderate the viscosity of a high-solids content hydrated lime suspension is to incorporate a polymeric dispersing agent. For example, certain polyacrylic acids have been used as dispersing agents to moderate the viscosity of such a high-solids suspension. However, the use of such dispersing agents to date has been limited because they become unstable and ineffective if exposed to temperatures above the boiling point of water. Accordingly, when such polymeric dispersing agents have been used, it has been necessary either to perform a time-consuming stepwise CaO-addition procedure—wherein quicklime is introduced into the water in relatively small, successive increments to ensure the slurry temperature never approaches the boiling point of water (which would inactivate the dissolved polymeric dispersant), or to use hydrated lime from the outset and mix it into the suspension. This latter method will avoid entirely the heat of reaction associated with hydrolysis of quicklime because the solids are already in the hydrated form when introduced into the suspension. However, this requires the additional step of pre-hydrating the quicklime before adding it to the slurry mixture, or otherwise purchasing hydrated lime for use in the suspension instead of quicklime, which may result in greater expense. In addition, hydrated lime is over 30% heavier than the corresponding amount of quicklime, which will result in significantly larger transportation and handling costs prior to mixing it into a slurry.

It is desirable to employ a hydrated-lime slurry having a dispersant therein that effectively moderates the viscosity to permit a usable slurry having at least 30 weight percent hydrated lime, and which is not inactivated at temperatures experienced as a result of the hydrolysis of quicklime to produce hydrated lime in the slurry.

SUMMARY OF THE INVENTION

A slurry for use as an alkaline-neutralization agent is provided. The slurry includes 30-60 weight percent suspended hydrated lime particles, 0.4-1.2 weight percent heat-stable polymeric dispersant calculated as a percentage of the hydrated lime present, 0-1.5 weight percent gypsum calculated as a percentage of the hydrated lime present, and the balance water. The slurry has a viscosity less than 1,000 cps at 70° F. The heat-stable polymeric dispersant is effective to withstand temperatures in excess of 212° F. without losing its ability to maintain the slurry viscosity below 1,000 cps at 70° F.

A method to prepare a hydrated-lime slurry is also provided, which includes the following steps: a) introducing a quantity of water into a mixing vessel for preparing the slurry; b) after or simultaneously with introducing the water, introducing a heat-stable polymeric dispersant into the vessel in an amount of 0.4-1.2 weight percent, calculated as a percentage of a desired amount of hydrated lime to be provided in the slurry; c) after introducing the heat-stable polymeric dispersant, introducing quicklime particles into the vessel in an amount sufficient to produce the desired amount of hydrated lime, but not less than 30 weight percent hydrated lime in the slurry, and d) permitting the quicklime and water in the vessel to react and produce hydrated lime therein through hydrolysis via an exothermic reaction. The heat-stable polymeric dispersant remains effective to maintain a viscosity of the slurry below 1,000 cps at 70° F. following the exothermic reaction.

BRIEF DESCRIPTION OF PREFERRED EMBODIMENTS

As used herein, when a range such as 5-25 (or 5 to 25) is given, this means preferably at least five and, separately and independently, preferably not more than 25.

A novel hydrated-lime slurry and method for making it are disclosed. The slurry can be used in all applications using slaked or hydrated lime or as a caustic replacement in softening applications or to neutralize acidic pH of wastewater and other aqueous liquids on a municipal, commercial or industrial scale. It can be made through the addition of quicklime to a carrier water phase, without the need to perform stepwise addition to prevent the water temperature from rising above boiling. The slurry contains a polymeric dispersant that does not suffer from the drawback of conventional polymeric dispersants described above. Specifically, the polymeric dispersant used in the present slurry composition can withstand elevated temperatures of or greater than 212° F., more preferably 220° F. or 225° F. without becoming inactivated or ineffective to moderate the hydrated-lime slurry viscosity to an acceptably low value. In addition, through use of the disclosed heat-stable polymeric dispersant, it has been found that gypsum also can be added to the slurry without resulting in substantial agglomeration of suspended small hydrated-lime particles as has been conventionally observed.

A slurry as disclosed herein has the components disclosed below in table 1 in the described concentrations or amounts. In table 1, any concentration or range for one component may be combined with any concentration or range for all or any of the other components; it is not necessary or intended that all concentrations or ranges for every component must come from the same column.

TABLE 1

Composition for making hydrated-lime slurry

| Component | Preferred (wt. %) | Less Preferred (wt. %) | Less Preferred (wt. %) |
|---|---|---|---|
| Hydrated lime $(Ca(OH)_2)$‡ | 37-41 | 35-45 | 30-55 |
|  |  | 30-50 | 30-60 |
| Heat-stable polymeric dispersant* | 0.76 | 0.7-0.8 | 0.5-1 |
|  |  | 0.6-0.9 | 0.4-1.2 |
| Gypsum* | 1.06 | 1-1.2 | 0.8-1.4 |
|  |  | 0.9-1.3 | 0-1.5 |
| Water |  | BALANCE |  |

‡The hydrated lime is formed in situ via the addition of quicklime (CaO) to the carrier water followed by hydrolysis thereof to produce hydrated lime, as more fully explained below.
*The amounts of heat-stable polymeric dispersant and gypsum mentioned in table 1 are percentages by weight of the specified component calculated based on the total weight of hydrated lime in the slurry, and are not based the total slurry composition. For example, assuming the most preferred embodiment from table 1, if the final slurry is to contain 40 weight percent hydrated lime, then 0.30 weight percent of the total slurry is heat-stable polymeric dispersant (0.76% based on 40 wt. % quicklime) and 0.42 weight percent of the total slurry is gypsum (1.06% based on 40 wt. % quicklime).

The hydrated lime is in the form of a suspended powder or particulate preferably having a mean particle size not greater than 40-mesh. In further embodiments, the hydrated lime powder can have a larger particle size whose upper bound is determined solely based on how quickly the resulting slurry is desired to react to neutralize an acidic solution. Larger sized hydrated lime particles will provide a smaller available surface area for reaction than a comparable mass of smaller particles. In preferred embodiments, the hydrated-lime particles have a mean particle size smaller than 40 mesh, preferably not greater than 50-mesh, preferably not greater than 100-mesh, preferably not greater than 200- or 300-mesh, more preferably not greater than 325-mesh.

The heat-stable polymeric dispersant is selected so that it is effective to maintain the hydrated lime particles (resulting from hydrolysis of the quicklime particles) suspended and sufficiently disperse in the water carrier phase so as to appropriately moderate the suspension viscosity as further described below for an extended period. At the same time, the heat-stable polymeric dispersant can withstand temperatures in excess of 212° F., more preferably 215° F., 220° F. or 225° F. without losing the above-mentioned capability. In a preferred embodiment, the heat-stable polymeric dispersant is a straight-chain polyacrylate homopolymer having a molecular weight in the range of 4500-5000 g/mol, which is made using an organic initiator and an isopropyl alcohol chain-transfer agent. The straight-chain structure, it is believed, contributes to a high degree of thermostability. The organic initiator replaces the persulfate/bisulfite redox reagents typically used as acrylate initiators, and the isopropyl-alcohol chain-transfer agent regulates chain-length and molecular weight within the desired range without introducing ferrous sulfate typically used to make low molecular-weight polyacrylates, and consequently excludes or is substantially devoid of iron from the finished straight-chain homopolymer. Such a homopolymer is available commercially from Coatex, LLC, Chester, S. Carolina under product designation TH450-50AS, which is a straight-chain polyacrylate homopolymer having a nominal molecular weight of 4500 g/mol and which comprises 50% acid solids.

The gypsum is supplied as a powder and should have a mean particle size less than 100-mesh. Gypsum is an optional but preferred component, and when present it helps moderate the viscosity of the finished hydrated-lime slurry within desirable limits as explained below, and also reduces the demand of the heat-stable polymeric dispersant mentioned above.

The water mentioned in table 1 serves as the continuous phase for the suspension, and is the medium in which the remaining, undissolved components (e.g. hydrated lime) are suspended in the finished slurry.

The slurry is preferably prepared according to the following methodology, wherein hydrated lime is produced in situ through hydrolysis of quicklime. The volume of total slurry at the desired hydrated-lime solids content is first determined based on application-specific parameters. Once these values are known, the appropriate amount of water is charged to a mixing vessel equipped with agitators in which the slurry is to be prepared. The applicant has used a Porta Batch® mobile slurry production unit successfully, although other agitator-equipped vessels capable to withstand temperatures achieved when slaking (hydrating) quicklime (up to or above 225° F.) are also considered useful to prepare the disclosed slurries and could be used. Porta Batch® systems are available from Chemical Lime Company, Fort Worth, Tex.

Once the total amount of slurry and the hydrated-lime concentration to be produced have been determined, an appropriate amount of water is added into the vessel where the slurry will be prepared. The corresponding amount of heat-stable polymeric dispersant from table 1 can be added simultaneously with the water addition, or afterward. In an exemplary embodiment it is desirable to add the heat-stable polymeric dispersant and the water at the same time, for example by co-injecting them or by impinging the dispersant into the water stream when filling the vessel, which will accelerate thorough and uniform mixing of the dispersant into the water. After both the water and the dispersant have been added, it is desirable to continue agitating the mixture for a period of time, for example 10 minutes, to ensure uniform mixing. If gypsum is to be added to the slurry, it is preferable to add it just prior to adding the quicklime into the mixture. As for the dispersant, it will be necessary to first know the final desired hydrated-lime concentration in the slurry in order to measure and deliver an appropriate amount of gypsum into the vessel.

Subsequently, the quicklime is added into the water within the vessel under constant agitation. It is desirable to inject the powdered quicklime below the water surface within the vessel to avoid the generation of dust, which can result not only in certain health concerns for the operator but also the loss of an unknowable amount of quicklime from the hydrolysis reaction to produce suspended $Ca(OH)_2$. The rate of quicklime addition to the water can be regulated by the operator, but generally for water volumes on the order of 15,000 gallons and quicklime quantities on the order of 50,000 pounds (which will produce a slurry of nominally 39-40 wt. % hydrated lime), the addition typically should last from one to two hours, more typically from one to 1.5 hours. One should recognize that hydrated lime ($Ca(OH)_2$), having a molecular weight of 74.1 g/mol, is a heavier molecule than quicklime (CaO), which has a molecular weight of 56.1 g/mol. Accordingly, the mass of quicklime added to the slurry, although proportional to the resulting mass of hydrated lime, is not equal to it. To obtain an estimate of what will be the weight of hydrated lime resulting from a particular addition of quicklime the ratio of their molecular weights can be used. That is, 50,000 pounds of quicklime should produce approximately 66,000 pounds of hydrated lime solids following hydration (50,000 pounds×74.1/56.1, which reduces to 50,000 pounds× 1.32). If it is desirable to calculate the appropriate quantities of polymeric dispersant and gypsum from table 1 based on the amount of quicklime that is to be used, then one need simply multiply the values for polymeric dispersant and gypsum in table 1 by 1.32 to obtain the corresponding percentages of those components based on the amount of quicklime to be introduced (i.e., most preferred polymeric dispersant concentration is 1% based on quicklime; most preferred gypsum concentration is 1.4% based on quicklime).

Based on the molar stoichiometric ratio of CaO to $H_2O$ in the hydration reaction (1:1 by moles), about 0.32 pounds of water are consumed to hydrate each pound of CaO to produce $Ca(OH)_2$. Using the exemplary quantities in this paragraph, one can see that 50,000 pounds of quicklime addition into 15,000 gallons of water should result in about 66,000 pounds of hydrated lime, which will produce nominally about 38.7 weight percent hydrated lime suspended in water, calculated as follows:

50,000 lbs quicklime×1.32 pounds hydrated lime/ pound quicklime=66,000 pounds hydrated lime 50,000 pounds quicklime×0.32 pounds $H_2O$ consumed/pound quicklime=16,000 pounds water consumed 120,640 pounds $H_2O$ (initial) [based on 15,000 gal and ρ=8.32 lb/gal]−16,000 pounds $H_2O$ (consumed)=104,640 pounds $H_2O$ remaining after hydrolysis 66,000 pounds hydrated lime/(104,640 pounds $H_2O$+ 66,000 pounds hydrated lime)=~38.7 weight percent hydrated lime slurry The above calculation neglects the weights of the polymeric dispersant and the gypsum (if present) added to the slurry, which together will make up a small percentage of the total hydrated lime. If accounted for, these additional components would be expected to slightly lower the calculated weight-percent concentration of hydrated lime in the total slurry. The contributions of these components on the weight percent of hydrated lime in the finished slurry may be neglected due to their minimal impact, or accounted for in the calculations, and making such calculations is well within the capability of one having ordinary skill in the art. For example, at 0.76 wt. % polymeric dispersant and 1.06 weight percent gypsum (both calculated based on the total weight of hydrated lime), this would contribute an additional 1,200 pounds (~500 pounds dispersant and ~700 pounds gypsum) to the slurry, wherein the calculated hydrated-lime concentration would then be 38.4 weight percent. The true final solids (hydrated lime) concentration in the finished slurry is also influenced by the amount of water evaporation during the hydrolysis reaction, which is exothermic. Some water from the slurry will be lost to vaporization during or following hydrolysis before the slurry cools, and this will have the effect of slightly increasing the actual hydrated-lime concentration.

The quicklime begins to hydrolyze immediately on being introduced into the water. Consequently, during the time when the quicklime is added the temperature of the reaction vessel and its contents will rise, typically exceeding 220° F. and potentially exceeding 225° F. Depending on the amount of slurry and the concentration of hydrated lime to be used, the hydration reaction typically will be complete within two to three hours after quicklime addition is complete for a typical amount and concentration of slurry (e.g. 15,000 initial gallons of water at 37-41% hydrated lime solids), at which time the vessel contents will begin to cool. As the Example below will demonstrate, slurries made according to this process possess Brookfield viscosities in the range of 650-1,000 cps measured at 70° F. and 5 RPMs, with spindle #2, despite solids loadings in the range of 30-46 weight percent.

A benefit of using the heat-stable polymeric dispersant is that it can withstand the high temperatures in the slurry resulting from the hydrolysis of quicklime to hydrated lime. Thus, the dispersant can be added to the slurry mixture before the quicklime addition, and remains functional to moderate viscosity for the finished high-solids slurry (post-hydrolysis) to within an acceptable range from a materials-handling standpoint, for example below 2,000 cps, more preferably below 1,500 cps, more preferably below 1,200 cps, more preferably below 1,000 cps, more preferably below 900 cps, for example in the range of 600-800 cps or 650-800 cps, at 70° F. In addition, it has been found that slurries having the compositions and made as described above do not result in substantial agglomeration and sedimentation of hydrated-lime particles, despite the incorporation of gypsum. The exact reason for this is not known, although it is believed that the heat-stable polymeric dispersant described above may somehow inhibit the sort of particle agglomeration that typically has been known to result based on the addition of gypsum as a viscosity-control agent.

The ability of the heat-stable polymeric dispersant to withstand the temperatures seen during lime hydration (slaking) is significant, because it has been found to be important to add the dispersant to the water for the slurry before slaking the lime. While post-addition (i.e. to the slurry after quicklime has been slaked to produce the hydrated lime in suspension) of the polymeric dispersant has been found to lower slurry viscosity from baseline for a ~40% solids slurry without no dispersant at all, the resulting slurry viscosity is still too high (e.g. on the order of 10,000 cps) to permit efficient handling and pumping with existing industrial equipment, which typically requires a viscosity below about 1,000 cps for efficient handling of fluids. Thus, the order of adding the dispersant is important, and preferably it is added to the water prior to the introduction of quicklime to produce hydrated lime in situ.

The present invention will be better understood through reference to the following Example, which is provided by way of illustration only and not limitation.

Example

Ten samples of a high-solids hydrated-lime slurry were prepared according to the foregoing methods. To make each sample, 15,000 gallons of water were added to the mixing chamber of a Porta Batch® unit as described above. In all but sample 2 from table 2, the TH450-50AS straight-chain polyacrylate homopolymeric dispersant was added to the clean water, before quicklime addition, in an amount calculated at 1% of the quicklime addition (sometimes referred-to as 'pebble lime'). In sample 2, 1% based on quicklime was also added to the slurry but not until after slaking to produce hydrated lime in the slurry. Gypsum was also added to each sample, at a rate of 1.4% based on quicklime.

Quicklime was added to each sample (after polyacrylate polymeric dispersant for samples 1 and 3-10, and beforehand for sample 2) in an amount calculated to produce from 34 to 41 weight percent suspended hydrated-lime solids. Measured hydrated-lime solids are provided below in table 2 for each sample. After slaking and following sufficient time to permit the finished slurry to cool (following the hydration reaction), the viscosity of each sample was measured using a Brookfield viscometer at 70° F. and 5 RPMs (spindle #2). The results are reported below in table 2.

TABLE 2

Hydrated-lime slurry samples

| Sample No. | Solids (wt. %) | Brookfield viscosity (cps, at 70° F. and 5 RPMs - spindle #2) |
|---|---|---|
| 1 | 31.8 | 753 |
| 2 | 34.8 | 13,650 |
| 3 | 41.8 | 926 |
| 4 | 34.6 | 634 |
| 5 | 35.9 | 660 |
| 6 | 36.3 | 780 |
| 7 | 41.9 | 780 |
| 8 | 41 | 680 |
| 9 | 39.6 | 710 |
| 10 | 45.3 | 760 |

Note how sample 2, in which the polymeric dispersant was added after the lime was slaked, exhibited a viscosity 15-20 times greater than the other samples wherein the dispersant was added to the clean water, prior to the introduction of quicklime.

Additional benefits of using the heat-stable polymeric dispersant as described herein is that the mixing/blending vessel where the slurry is prepared has been observed to exhibit a substantial reduction in scale buildup. Pipes and pumping systems for transporting the slurry also have been observed to be substantially deposit-free and not to suffer from plugging as with conventional hydrated-lime slurries. In addition, it has been observed that using a hydrated-lime slurry as disclosed herein, it is possible to obtain comparable pH neutralization of wastewater as compared with conventional lime-based slurries, with a smaller amount of slurry. This suggests that a hydrated-lime slurry as disclosed herein is more reactive from a pH-neutralization standpoint than conventional lime slurries, which may be due to the polymeric dispersant disclosed herein being more effective to sustain small particles in suspension (preventing sedimentation and the deposition of sludge), as well as to permit a high-solids content of relatively small-sized hydrated lime particles (having greater available surface area) while maintaining an acceptable viscosity for material-handling purposes. The slurry as disclosed herein has been seen not to result in significant sludge deposition (fouling) as mentioned above, which further supports the conclusion that more of the hydrated-lime material remains suspended and effective to participate in chemical reactions, to neutralize pH or to participate in lime softening reactions.

Furthermore, the slurries, once made, can be stored for extended periods of time if necessary. If stored for a long enough time that settling does occur, the solids can simply be stirred back up through mixing or agitation prior to use. The slurry does not suffer from significant particle agglomeration as already discussed, so it is possible to re-suspend the solids prior to subsequent use.

Another benefit of the slurries disclosed herein is that they exhibit comparable reducing or alkaline-pH neutralizing power as alkali-metal hydroxide solution caustic agents while not requiring the addition of potentially hazardous alkali-metal hydroxides to the slurries. A conventional lime-based caustic-replacement slurry includes a quantity alkali-metal hydroxide in the slurry. In an exemplary embodiment, the slurry presently disclosed does not require this addition, and preferably excludes it.

Although the invention has been disclosed with respect to certain preferred embodiments, it is to be understood that various modifications and alterations thereto are possible and will be readily recognized by persons of ordinary skill in the art, all of which are reasonably within the scope of the invention herein disclosed, and as set forth in the appended claims.

What is claimed is:

1. A slurry for use as an alkaline-neutralization agent, comprising:
    30-60 weight percent suspended hydrated lime particles, said hydrated lime particles having a mean particle size not greater than 50 mesh;
    0.4-1.2 weight percent heat-stable polymeric dispersant, calculated as a percentage of the hydrated lime present;
    gypsum present at not more than 1.5 weight percent, calculated as a percentage of the hydrated lime present; and
    balance water.

2. The slurry of claim 1, said hydrated lime particles having a mean particle size not greater than 40-mesh.

3. The slurry of claim 1, said slurry having a viscosity less than 2,000 cps at 70° F. and said heat-stable polymeric dispersant being effective to withstand temperatures in excess of 212° F. without losing its ability to maintain said slurry viscosity below 2,000 cps at 70° F.

4. The slurry of claim 1, said heat-stable polymeric dispersant being effective to withstand temperatures in excess of 220° F. without losing its ability to maintain said slurry viscosity below 2,000 cps at 70° F.

5. The slurry of claim 1, said heat-stable polymeric dispersant comprising a straight-chain polyacrylate homopolymer having a molecular weight in the range of 4500-5000 g/mol, which is made using an organic initiator and an isopropyl alcohol chain-transfer agent.

6. The slurry of claim 5, said straight-chain polyacrylate homopolymer being substantially devoid of iron.

7. The slurry of claim 5, said straight-chain polyacrylate homopolymer having a nominal molecular weight of 4500 g/mol.

8. The slurry of claim 5, said straight-chain polyacrylate homopolymer comprising 50% acid solids.

9. The slurry of claim 1, said slurry excluding alkali-metal hydroxides.

10. The slurry of claim 1, said slurry having a viscosity in the range of 600-800 cps at 70° F.

* * * * *